United States Patent [19]

Josephson

[11] 3,715,595
[45] Feb. 6, 1973

[54] PULSED NEUTRON SORCE

[75] Inventor: Vernal Josephson, Palos Verdes Estates, Calif.

[73] Assignee: The United States of America as represented by the Secretary of the United States Air Force

[22] Filed: May 11, 9170

[21] Appl. No.: 48,762

[52] U.S. Cl. .................. 250/84.5, 313/61, 176/6
[51] Int. Cl. ............................. G21g 3/04
[58] Field of Search ................ 250/84.5; 176/6

[56] References Cited

UNITED STATES PATENTS 2,923,852  2/1960  Scott et al. ................... 250/84.5
2,735,019  2/1956  Dewan et al. ................. 250/84.5
2,933,611  4/1960  Foster, Jr. .................... 250/84.5
3,359,422  12/1967  Pollock ....................... 250/84.5

*Primary Examiner*—Reuben Epstein
*Attorney*—Harry A. Herbert, Jr. and Jacob N. Erlich

[57] ABSTRACT

An apparatus for producing neutrons having a base portion, an energy source and a pair of uniquely designed electrodes, one of which is at least partially of titanium. These electrodes are shaped so as to cause a tri-dimensional compression on the plasma or ionized gas within this apparatus. The tri-dimensional compression in conjunction with the titanium electrode provides for higher temperatures and neutron yields than were heretofore possible.

8 Claims, 2 Drawing Figures

PATENTED FEB 6 1973 3,715,595

INVENTOR.
VERNAL JOSEPHSON
BY Harry A. Herbert Jr.
and
Jacob N. Erlich
ATTORNEYS

PULSED NEUTRON SORCE

BACKGROUND OF THE INVENTION

This invention relates generally to an apparatus for producing pulsed neutrons, and more particularly to such a device which utilizes a unique electrode material and is designed so as to produce high temperatures and neutron yields.

It is necessary under certain circumstances to produce pulsed neutrons having extremely high flux rates and pulse lengths in order to, for example, verify a military systems hardness to radiation effects generated by hostile nuclear detonation. In order to produce these neutrons, it is necessary to produce by electrical, or other means, an ionized gas or plasma and then raise the plasma to kilovolt temperatures as by compression.

In such units heretofore in use, the ions and electrons of the plasma are continuously and rapidly being cooled and recombining by contact with the chamber walls, so that the temperature is low and the state of ionization is only partial and can be maintained only by a large continuous input of energy. It became necessary to find some means of electromagnetic confinement of the plasma once created so that its particles do not touch the chamber walls. Effective confinement is one prime objective of high temperature plasma research and is the basis for hopes of achieving controlled nuclear power from nuclear fusion reactions in hot plasma. Without such means a high-temperature plasma, even if it could be created, would have only a fleeting existence, typically less than one millionth of a second.

One of the earliest concepts as a means of achieving thermonuclear temperatures in an ionized gas, such as deuterium, was the "pinch method." The "pinch" concept utilizes the magnetic field produced by high current flow in an ionized gas column to compress the ionized gas or plasma to high pressures and temperatures. The temperature achieved depends on the speed and degree of radial compression. The apparatus for such a pinch concept consisted of a coaxial geometry of two electrodes with a condenser supply connected by a spark gap switch applied between them. The radial discharge and the accompanying magnetic field propelled the plasma along the tube to the end of the center electrode. Here a radial pinch takes place producing the short intense neutron burst. The hot spot is very small and intense in both soft x-rays as well as neutrons. The condenser energy supply characteristics and the tube electrode lengths are chosen so that the time for the oscillatory current peak coincides with the arrival time of the plasma at the pinch position. Since the inductance of the circuit and the total plasma mass increase linearly with the electrode length, the peak current is decreased in an unfavorable manner. Furthermore, the pinch concept became unattractive when it was discovered that instabilities grew rapidly and allowed the plasma to escape from the confined area. Also the megelectron volts produced and the flux rates and pulsed lengths fell short of the requirements necessary for the proper verifying of a military systems hardness to radiation.

Another recognized deterrent to the achievement of thermonuclear temperatures in plasma discharge assemblies is the effect of impurities. This is due to the fact that impurities in the plasma having a greater atomic number than deuterium will radiate bremsstrahlung energy out of the plasma at a greater rate than the deuterium due to the $Z^2$ term in the radiation process. Thus, the ultimate temperature achievable in the plasma assembly will be limited by this radiation rate. Workers in the field have attempted to minimize this effect by using very clean systems which are bakeable and which can achieve very high base vacuum. However, the shot to shot performance of such machines, under identical starting conditions, is not too good, thus indicating some uncontrolled factor affecting the machine's performance.

SUMMARY OF THE INVENTION

The pulsed neutron source of the instant invention overcomes the problems heretofore encountered and as set forth in detail hereinabove.

The design of the instant invention produces a neutron source of 14 Mev and having flux rates in the area of $10^{17}/cm^2/sec$ and pulse lengths of approximately one micro sec. Furthermore, by the utilization of a titanium or zirconium electrode average neutron yields can be increased by an additional factor of 10. Further, the instant invention permits a decreased electrode length for a specified plasma mass swept up during the early part of the compression, and near the peak of the compression, the length does not vary. Throughout the compression phase, the changing electrode diameters of the instant invention results in a logarithmic rather than only an linear change in inductance.

A further advantage of this invention is that it can be operated at reduced pressures where the discharge can initiate only back near the insulator where the Paschen law pd relationship will permit gas breakdown. Furthermore, this invention utilizes a sealed-off design with a deuteride source and the titanium electrode. The discharge struck in the deuterium gas will cause evolution of absorbed deuterium for the discharge electrode resulting in a lesser degree of electrode erosion. This invention allows for a smooth tri-dimensional compression which would produce higher temperatures and neutron yields than heretofore possible.

The apparatus of this invention contains an outer and inner electrode and a base insulator. Energy is fed from a plurality of capacitors and is switched by a plurality of ignitrons through low inductance coaxial cables to a connector on the base periphery. Palladium filtered deuterium is fed into a port located on the side of the outer electrode. The outer electrode is parabolically-shaped, while the inner electrode made of titanium or zirconium has a small diameter at the base, and is flared to a larger diameter having a hemispherical end. The least amount of area between the electrodes is at the top adjacent the hemispherical end of the inner electrode. Because of the large electrode spacing at the base easy gas breakdown and uniform sheath formation can be obtained at very low pressures.

Functionally, the energy from a bank of high-voltage capacitors is introduced to these electrodes, causing a breakdown in the gas and formation of a current sheet. This current sheet is accelerated along the electrode structure by magnetic forces until it reaches the end of the inner electrode, when a rapid and violent compression occurs, thus producing a hot, dense plasma focus. The nuclear reactions that take place during the focus are determined by the nature of the gas that fills the space between the two electrodes. The neutron yield in the paraboloidal plasma Z-pinch device of this invention increases markedly when titanium is used for the anode material. Neutron yields of $3\times10^{10}$ per shot have been obtained with an energy source as low as 18 kJ-an extremely high yield for such a modest energy bank.

It is therefore an object of this invention to provide an apparatus which is capable of producing high temperatures and neutron yields.

It is another object of this invention to provide an apparatus for producing neutrons which can be operated at reduced temperatures.

It is still another object of this invention to provide an apparatus for producing neutrons which utilizes titanium in order to improve the efficiency of the inner or center electrode.

It is a further object of this invention to provide an apparatus for producing neutrons which is economical to produce and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE PREFERRED EMBODIMENT

Figure 1:
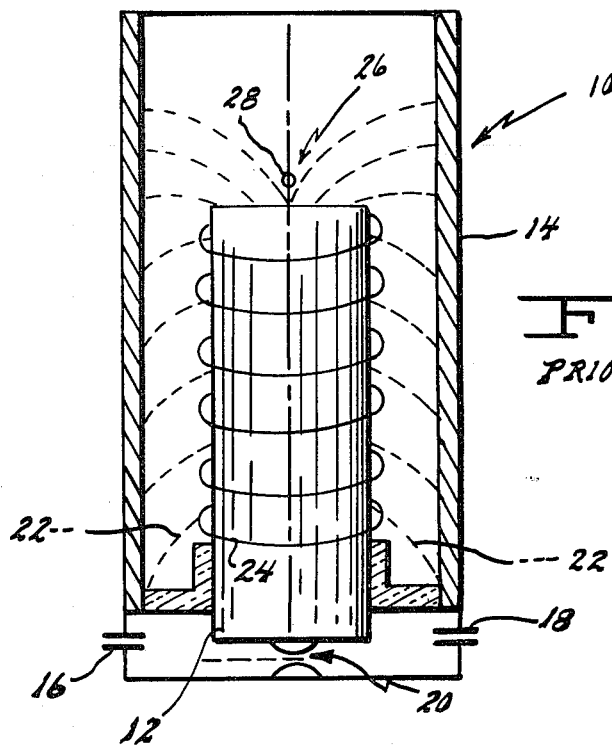
FIG. 1 is a side elevational view of a prior art apparatus which has been utilized for producing neutrons and which is shown partly in cross section.

Reference is now made to FIG. 1 which represents a device which was heretofore utilized in producing neutrons. This neutron producing source 10 is made up of a tube-like structure containing a pair of electrodes 12 and 14. These electrodes, being an inner electrode 12 and an outer electrode 14, have a condenser supply 16 and 18 between them and are connected together by means of a spark gap switch 20. The radial discharge 22 originating at the base of neutron source 10 between electrodes 12 and 14 and the accompanying magnetic field 24 propel the plasma along the tube-like structure from the bottom thereof to the upper end of the inner electrode 12. At this point a radial pinch 26 takes place and produces a short intense neutron burst. This is denoted by a hot spot 28 which is very small and is intense in both soft x-rays as well as neutrons. The characteristics of the condenser energy supply 16 and 18 and the length of the inner electrode 14 are chosen so that the time for the oscillatory current peak coincides with the arrival time of the plasma at the pinch position 26. However, since the inductance of the circuit and the total plasma mass increases linearly with the electrode length, the peak current is decreased in an unfavorable manner. The neutron source 10, however, produces only a radial compression of the plasma and since the ionized gas or plasma depends on this compression for its high pressures and temperatures, merely a radial compression fails to produce neutrons having high flux rates and pulse lengths. Furthermore, the "pinch" concept as set forth in FIG. 1 became unattractive when it was discovered that instabilities grew rapidly and allowed the plasma to escape from the confined area.

Figure 2:
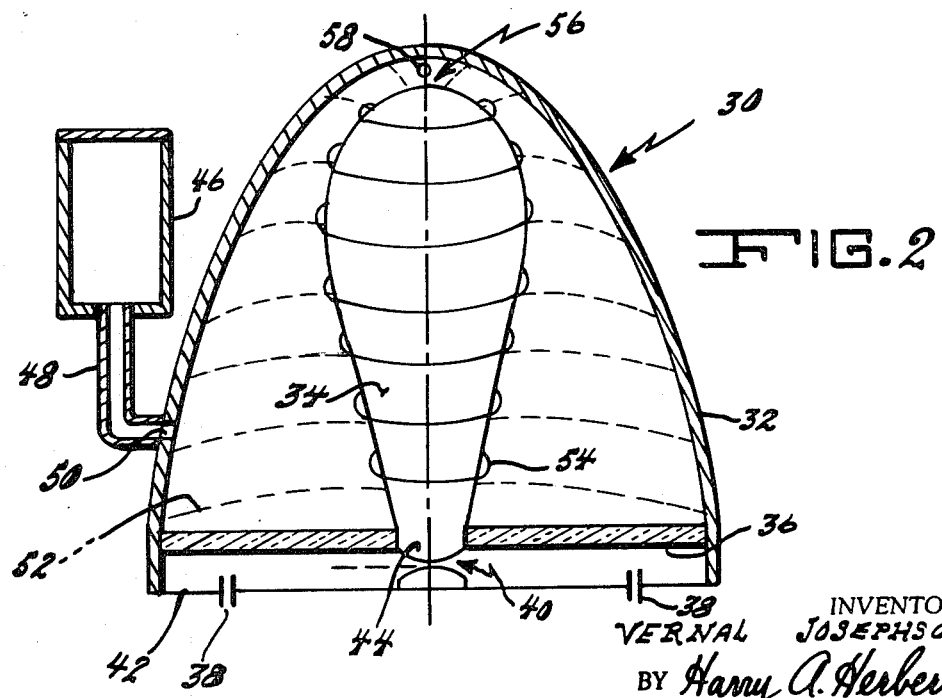
FIG. 2 is a side elevational view of the apparatus of this invention for producing neutrons and shown partly in cross section.

Reference is now made to FIG. 2 which shows the neutron source 30 of the instant invention. The neutron source 30 of this invention is made up of a design which produces a smooth tri-dimensional (3D) compression of the ionized gas or plasma contained therein and therefore produces extremely high temperatures and neutron yields. It is primarily the shape of the electrodes which furnishes this three-dimensional or axial and radial compression. The neutron source 30 of the instant invention is constructed of an outer electrode 32 and an inner electrode 34. The electrodes 32 and 34 are separated by an insulator base 36 which is made of any suitable insulatory material such as Pyrex. Energy for the neutron source 30 of this invention is fed from a plurality of capacitors 38 (two of which are shown in FIG. 2). This energy is switched by at least one ignitron 40 through low inductance coaxial cables 42 to connectors 44 adjacent the insulator base 36 of the neutron source 30.

The outer electrode 32 is parabolically-shaped having the diameter of its base portion and its height substantially equal and somewhere in the order of 30cm. The inner electrode 34 is located in the center of insulator base 36. Electrode 34 has a small base portion (approximately 3cm in diameter) extending to a section near the upper end (approximately 10cm in diameter) where it becomes hemispherically shaped adjacent the outer electrode 32. The space at the upper end between electrodes 32 and 34 is extremely small (approximately 2cm) when compared to the distances between the electrode 32 and 34 at the base (approximately 13.5cm). It should be noted, however, that the dimensions given above are only an example of a preferred operational neutron source 30 and that any multiple of these dimensions will also be operable.

Any conventional storage tank 46 is connected to the outer electrode 32 by a tube 48. The tank 46 contains any suitable gas such as deuterium and this gas is fed through electrode 32 buy a port 50 into the space between inner electrode 34 and outer electrode 32. The design of the instant invention permits a decreased electrode length for a specified plasma mass swept up during the early part of the compression, and near the peak of the compression the length of the electrode does not vary. Throughout the compression phase, the changing electrode diameters of inner electrode 34 result in a logarithmic rather than only a linear change in inductance. The radial discharge 52 of the instant invention initiates at the base and the accompanying magnetic field 54 associated therewith propels the plasma in the upward direction until an axial as well as radial pinch takes place 25 56.

Impurities play an important factor affecting the performance of the plasma compression concepts of this invention which is designed to achieve extremely high densities and temperatures. In thermonuclear assemblies where the working fluid (plasma) consists of ionized isotopes of hydrogen, any other ionized material, because of its higher atomic number will act as a radiation sink, thus minimizing or limiting the temperature rise, and will also act as a poison because of its vanishingly small cross-section for thermonuclear reactions. While extremely clean vacuum systems are effective in keeping the base impurity level low, it will not eliminate impurities generated during the compression and heating cycle.

In order to prevent contaminating the discharge during the maximum compression phase, it is necessary in this invention to use a material as the electrode 34 which has a very high boiling temperature, a large thermal capacity, very good electrical conductivity, a low atomic number, and which can be easily fabricated. Since no material has a boiling point exceeding that sought in the discharge, the materials available which best fit the above criteria will merely delay the arrival of impurities but will not minimize them.

The only elements which are not a greater radiation sink than deuterium and which will produce fusion reactions are deuterium and tritium themselves, therefore, they are the ideal electrode materials and can be effectively utilized by making the electrodes from low atomic number metals which hydride. Titanium (1) will absorb great quantities of deuterium and release it rapidly when heated; (2) has a lower atomic number than copper (22 vs 29); (3) its boiling point is $>>3,000°C$ vs $\approx 2,300°C$ for copper; and (4) its electrical and thermal capabilities are similar to copper. Finally, it would appear that the rapid evolution of deuterium during the pulse would "transpiration cool" the titanium so that it would not evaporate thus leaving only cold deuterium as the contaminant. By utilizing an inner electrode 34 of titanium or zirconium, after being heated up by a discharge, it rapidly absorbs the deuterium gas and automatically becomes the titanium deuteride electrode dictated by this invention.

The unique design of the electrodes 32 and 34 produces a tri-dimensional compression on the plasma and along with the evolution of the tritium from the discharge or inner electrode 34 results in an extremely high neutron yield at the hot spot 58. In fact, the introduction of hydrogen-gettering metals titanium and zirconium as electrodes 34 in a paraboloidal plasma Z-pinch device of this invention has produced a substantial increase in the neutron yield. Yields up to $3 \times 10^{10}$ neutrons per shot have been obtained using titanium-tipped electrodes 34 in deuterium gas with energy sources as low as 18 kJ. The effect of these metals, however, in increasing the neutron yield is sensitive to the compression obtained in the pinch device of this invention. This effect is small or non-existent in Z-pinch devices of the prior art (shown in FIG. 1) with cylindrical electrodes 12 and 14 where the space between the anode and cathode is large in the region of the pinch.

MODE OF OPERATION

In operation a gas, such as deuterium, is fed from storage tank 46 into the space between electrodes 32 and 34. The energy for the instant invention is produced by the condenser supply 38. A radial discharge 52 is produced at the base of the source 10 between electrodes 32 and 34. This discharge in the deuterium gas causes the evolution of tritium from electrode 34 and results in the proper gaseous mixture for operation. The discharge or current 52 along with an accompanying magnetic field 54 propels the ionized gas or plasma toward the upper end of center electrode 34. At this location 56 due to the unique configuration of electrodes 32 and 34 a tri-dimensional compression takes place, that is, an axial as well as radial pinch occurs. Such a pinch forms the hot spot 58 which produces the extremely high neutron burst.

Although this invention has been described with reference to a particular embodiment, it will be understood to those skilled in the art that the invention is capable of a variety of alternate embodiments within the spirit and scope of the appended claims.

I claim:

1. A neutron producing apparatus comprising an insulator base, an inner electrode having good conductivity, high evaporation resistance and good hydrogen gettering properties mounted on said base in the center thereof, said inner electrode having a small base portion extending to a flared section adjacent the upper end and becoming hemispherically shaped at the upper end thereof, a parabolically-shaped outer electrode mounted on said base and surrounding said inner electrode, an energy source electrically connecting said inner and outer electrodes and a gas source secured adjacent to said outer electrode for introducing a gas between said inner and outer electrodes.

2. A neutron producing apparatus as defined in claim 1 wherein the space between said electrodes at the upper end is extremely small compared to the space between said electrodes at the base.

3. A neutron producing apparatus as defined in claim 2 wherein said inner electrode contains titanium.

4. A neutron producing apparatus as defined in claim 3 wherein said gas is deuterium.

5. A neutron producing apparatus as defined in claim 4 wherein the diameter of the base of said outer electrode is substantially equal to its height.

6. A neutron producing apparatus as defined in claim 5 wherein the diameter of the flared section of said inner electrode is at least three times the diameter of its base portion.

7. A neutron producing apparatus as defined in claim 2 wherein said inner electrode contains zirconium.

8. A neutron producing apparatus as defined in claim 7 wherein said gas is deuterium.

* * * * *